(12) United States Patent
Wright et al.

(10) Patent No.: US 8,530,366 B2
(45) Date of Patent: Sep. 10, 2013

(54) PROTECTED FISCHER-TROPSCH CATALYST AND METHOD OF PROVIDING SAME TO A FISCHER-TROPSCH PROCESS

(75) Inventors: Harold A. Wright, Longmont, CO (US); Belma Demirel, Longmont, CO (US); Sergio Mohedas, Westminster, CO (US); Bahman Rejai, Littleton, CO (US); Ray Huang, Denver, CO (US); Deena Ferdous, Aurora, CO (US); Jesse W. Taylor, Baldwinsville, NY (US); Dawid J. Duvenhage, Evergreen, CO (US); Sara L. Rolfe, Loveland, CO (US)

(73) Assignee: Rentech, Inc., Los Angeles, CA (US)

( * ) Notice: Subject to any disclaimer, the term of this patent is extended or adjusted under 35 U.S.C. 154(b) by 335 days.

(21) Appl. No.: 12/984,902

(22) Filed: Jan. 5, 2011

(65) Prior Publication Data

US 2011/0313061 A1 Dec. 22, 2011

Related U.S. Application Data

(60) Provisional application No. 61/296,354, filed on Jan. 19, 2010.

(51) Int. Cl.
*B01J 20/34* (2006.01)
*C07C 27/00* (2006.01)

(52) U.S. Cl.
USPC .................. 502/34; 502/20; 502/21; 518/700

(58) Field of Classification Search
USPC ............................... 502/20, 21, 34; 518/700
See application file for complete search history.

(56) References Cited

U.S. PATENT DOCUMENTS

| | | | |
|---|---|---|---|
| 4,480,051 A | 10/1984 | Wu | |
| 4,994,428 A | 2/1991 | Bell et al. | |
| 5,200,236 A | 4/1993 | Lang et al. | |
| 5,504,118 A | 4/1996 | Benham et al. | |
| 6,294,498 B1 | 9/2001 | Darcissac et al. | |
| 6,475,943 B1 | 11/2002 | Hoek et al. | |
| 6,777,452 B2 | 8/2004 | Zhou et al. | |
| 6,787,577 B2 | 9/2004 | Davis et al. | |
| 7,001,928 B2 | 2/2006 | Raje | |
| 7,259,286 B2 | 8/2007 | Jothimurugesan et al. | |
| 2005/0027020 A1 | 2/2005 | Steynberg | |
| 2007/0161715 A1* | 7/2007 | Long et al. | 518/718 |
| 2009/0298958 A1 | 12/2009 | Clarkson et al. | |

OTHER PUBLICATIONS

International Search Report and Written Opinion dated Oct. 24, 2011 for corresponding International Application No. PCT/US2011/020201 (9 pgs.).

* cited by examiner

*Primary Examiner* — Jafar Parsa

(74) *Attorney, Agent, or Firm* — Timothy S. Westby; Porter Hedges LLP

(57) ABSTRACT

A method of preparing a spray dried catalyst by combining spray dried catalyst particles with wax so the spray dried catalyst particles are coated with wax, yielding wax coated catalyst particles, and shaping the wax coated catalyst to provide shaped wax coated catalyst. A method of activating Fischer-Tropsch catalyst particles containing oxides by contacting the catalyst particles with a reducing gas in an activation vessel to produce an activated catalyst, wherein contacting is performed in the absence of a liquid medium under activation conditions. A system for activating a Fischer-Tropsch catalyst containing an activation reactor configured to introduce an activation gas to a fixed or fluidized bed of the Fischer-Tropsch catalyst in the absence of a liquid medium and at least one separation device configured to separate a gas stream comprising entrained catalyst fines having an average particle size below a desired cutoff size from the activation reactor.

24 Claims, 4 Drawing Sheets

PROTECTED FISCHER-TROPSCH CATALYST AND METHOD OF PROVIDING SAME TO A FISCHER-TROPSCH PROCESS

CROSS-REFERENCE TO RELATED APPLICATIONS

This application claims the benefit under 35 U.S.C. §119(e) of U.S. Provisional Patent Application No. 61/296,354 filed Jan. 19, 2010, the disclosure of which is hereby incorporated herein by reference.

STATEMENT REGARDING FEDERALLY SPONSORED RESEARCH OR DEVELOPMENT

Not Applicable.

BACKGROUND

1. Technical Field

The present invention relates generally to Fischer-Tropsch production of hydrocarbons. More particularly, the present invention relates to a system and method for producing activated, sized and/or wax coated catalyst.

2. Background

Iron catalyst is known as a selective catalyst used in the Fischer Tropsch process to produce desirable hydrocarbons that are suitable for transportation fuel. Particularly, the iron catalyst is particularly suitable for utilization with synthesis gas produced from coal due to the water gas shift reaction. Conventionally, pre-treatment of iron catalyst is often conducted in the slurry phase, where the iron oxide is mixed with a liquid medium such as Fischer-Tropsch wax or paraffinic startup fluid and reduced by contact with a reducing gas. Once the iron oxide is reduced, the change of chemistry causes further breakage of catalyst and the undesirable generation of fines (typically catalyst particles less than about 20 μm). Traditionally, these fines remain in the slurry and become part of slurry matrix, creating challenges for downstream separation processes.

Iron catalyst having a particle size in the range of about 2-3 mm has conventionally been reduced in hydrogen and coated in wax for protection from oxidation during transport to activation reactors. Such a process enables less risky transport and facilitates loading such catalyst into a fixed bed reactor where the catalyst may be activated with synthesis gas to form the active carbidic phase. However, such a procedure is challenging with smaller spray dried catalyst particles which may have an average particle size in the range of 40-150 microns, depending on reactor size. Small spray dried catalyst particles readily combust in the presence of oxygen. Thus, removing such particles from a reduction reactor may create highly reactive and dangerous catalyst dust. As the spray dried catalyst particles are significantly smaller than catalyst particles utilized in fixed bed applications (e.g., generally less than 150 microns compared to 1-3 mm), the flow properties of such particles are different and it is generally not feasible to simply dump the catalyst into wax for coating under gravity.

As mentioned, Fischer-Tropsch catalyst activation is conventionally accomplished by mixing iron oxide (e.g., hematite) phase catalyst particles with liquid medium comprising hydrocarbons, such as but not limited to Fischer-Tropsch wax, paraffin, or oils, such as Durasyn®, and reducing the catalyst with synthesis gas (i.e. a gas comprising carbon monoxide and hydrogen), CO, or $H_2$. The reduction process involves dissolving a reducing gas in the liquid medium whereby reducing-gas-saturated liquid enters the catalyst pores and surfaces to activate the catalyst. This process generally involves at least two transfer steps to obtain the reduced catalyst particles. Mass transfer (i.e. contact of catalyst oxide with gas) is limited when the reduction is conducted in a three-phase environment. Furthermore, after reduction, the catalyst is conventionally transferred directly into a slurry bubble column reactor for synthesis. However, as the activation process causes some degree of breakage of catalyst due to the carburization, activation leads to variation of catalyst particle density, which may lead to increased amounts of fines following activation and/or increased amount of fines produced during subsequent Fischer-Tropsch synthesis.

It is generally known that the catalyst fines generated from the iron catalyst are difficult to separate from the Fischer Tropsch wax product. The sources of fines can be attributed to the initial catalyst manufacturing process, thermal contraction and expansion at the Fischer-Tropsch synthesis conditions, physical attrition caused by particle-particle, particle-gas, particle-reactor wall, and/or particle-reactor internal friction, and chemical attack by water. In addition, during the activation process, the iron catalyst particle size is generally reduced significantly through the carburization reaction. The difference in physical and chemical properties, such as density and composition, of the catalyst after the reduction further escalates undesirable particle breakage. The formation of iron carbide, e.g. $Fe_5C_2$, results in a different particle density as compared to the density of the oxide forms, e.g. hematite ($Fe_2O_3$) and/or magnetite ($Fe_3O_4$). The literature suggests that the breakage of catalyst particles is due to the volumetric stress generated during the carburization process, where nano-needle structure is fragmented.

An example of the activation reaction of catalyst comprising iron oxides in the presence of synthesis gas is depicted in Eq. (1) below. It is also known that the reducing gas can be a gas other than synthesis gas, such as hydrogen only, CO only, or methane. For activation with synthesis gas, activation proceeds as depicted in Eq. (1):

$$4Fe_2O_3 + 10\ H_2 + 2CO \rightarrow Fe_5C_2 + Fe_3O_4 + 10\ H_2O. \quad (1)$$

For activation with carbon monoxide only, activation proceeds as per Eqs. (2)-(3):

$$3Fe_2O_3 + CO \rightarrow 2Fe_3O_4 + CO_2, \text{ and} \quad (2)$$

$$5Fe_3O_4 + 32\ CO \rightarrow 3Fe_5C_2 + 26\ CO_2. \quad (3)$$

Eq. (1) suggests that carburization occurs favorably with a high $H_2/CO$ ratio and high pressure when synthesis gas is chosen as the activation gas for activating the iron catalyst. It has been reported, however, that high pressure activation with synthesis gas in a 3-phase reactor is unfavorable due to inefficient removal of the product water. Inefficient water removal leads to undesirable re-oxidation of carbides. In the prior art, the water product is typically mixed with Fischer-Tropsch product when using an in situ activation process, i.e. when catalyst is activated with synthesis gas in a production reactor. The presence of water in a Fischer-Tropsch reactor may also undesirably expedite the deactivation of the Fischer-Tropsch catalyst as studied in the literature.

U.S. Pat. No. 7,001,928 describes a method for improving the efficiency and effectiveness of in situ reduction of a Fischer Tropsch catalyst slurry. The '928 patent teaches using low concentrations of carbon monoxide (<2000 ppm) in the reducing gas in a slurry matrix to effectively activate a Fischer-Tropsch catalyst for better product selectivity.

U.S. Pat. No. 6,475,943 describes a process to activate a catalyst in the presence of a hydrocarbon liquid. The catalyst comprises a Group Ib, VIIb, or VIII metal compound. The '943 patent teaches the optimal hydrogen partial pressure for activating a catalyst in the presence of hydrocarbon is at least 15 bars.

U.S. Pat. No. 6,777,452 teaches the activation of promoted skeletal iron catalyst by contacting the catalyst with hydrogen. The activation is performed in a fixed bed reactor and the catalyst is mixed with a liquid medium, such as liquid paraffin or ethanol, and subsequently transferred into a Fischer-Tropsch reactor for synthesis.

U.S. Pat. No. 4,480,051 discloses a process for improving the iron oxide hydrogenation of catalyst by reducing the catalyst; oxidizing the reduced catalyst and then re-reducing the catalyst.

U.S. Pat. No. 6,787,577 describes a potassium promoted iron catalyst believed to improve product selectivity. The activation process of the '577 patent is conducted by contacting catalyst in a slurry matrix with a reducing gas.

Accordingly, there is a need in the industry for systems and methods that facilitate providing Fischer-Tropsch catalyst to a slurry bubble column Fischer-Tropsch reactor and/or whereby introduction of catalyst fines into the Fischer-Tropsch reactor(s) and/or production of fines therein during Fischer-Tropsch synthesis are minimized. Desirably, the system and method allow water produced during activation to be removed during the activation process.

SUMMARY

Herein disclosed is a method of preparing a spray dried catalyst, the method comprising: combining spray dried catalyst particles with wax such that the spray dried catalyst particles are coated with wax, yielding wax coated catalyst particles; and shaping the wax coated catalyst to provide shaped wax coated catalyst. In embodiments, the spray dried catalyst is a Fischer-Tropsch catalyst. In embodiments, the spray dried catalyst is a precipitated iron-based catalyst. The method can further comprise fluidizing the spray dried catalyst particles, to provide a fluidized bed. In embodiments, fluidizing comprises introducing an inert gas into a vessel containing the spray dried catalyst particles. The vessel can be a fixed bed or fluidized bed reactor. The method can further comprise activating the catalyst. In embodiments, activating comprises contacting the catalyst particles with an activation gas at an activation temperature. The activation gas can comprise hydrogen gas, carbon monoxide gas, or a combination thereof. In embodiments, contacting the catalyst particles with activation gas is performed at an activation temperature in the range of from about of 260° C. to about 285° C. for a time period in the range of from about 4 h to about 24 h. In embodiments, activating comprises contacting the catalyst particles with hydrogen whereby the catalyst particles are reduced and subsequently contacting the reduced catalyst particles with a gas comprising carbon monoxide, whereby the catalyst particles are carbided.

The method can further comprise slumping a fluidized bed of the spray dried catalyst particles prior to combining the spray dried catalyst particles with the wax. Activating can be performed prior to combining the spray dried catalyst particles with wax. In embodiments, activating and combining the spray dried catalyst particles with wax are performed in the same vessel. In embodiments, activating is performed subsequent to shaping.

In embodiments, activating further comprises introducing the shaped wax coated catalyst into an activation reactor, melting the wax, and contacting the catalyst with activation gas. The activation reactor can be a dedicated activation reactor. The activation reactor can be a Fischer-Tropsch production reactor. In embodiments, the catalyst is activated in a two-phase system by contacting the catalyst particles with a reducing gas in an activation vessel and contacting is performed in the absence of a liquid medium under activation conditions. In embodiments, the catalyst is a Fischer-Tropsch catalyst comprising iron oxides.

In embodiments, the method further comprises selectively removing catalyst fines below an average cutoff size during activation. Selectively removing catalyst fines below an average cutoff size during activation can comprise separating the fines from the activation vessel with at least one separation device. One of the at least one separation devices can be located at least partially internal to the activation vessel. In embodiments, the at least one separation device is selected from cyclones, filtration units, and combinations thereof.

In embodiments, the reducing gas comprises hydrogen and substantially no carbon monoxide, carbon monoxide and substantially no hydrogen or both hydrogen and carbon monoxide. The activation vessel can be a fluidized bed reactor. In embodiments, the spray dried catalyst particles have an average particle diameter in the range of from about 0.5 μm to about 200 μm.

The method can further comprise condensing an activation reactor effluent gas whereby water, hydrocarbons, or both are removed, providing a non-condensed gas comprising reducing gas. The method can further comprise recycling at least a portion of the non-condensed gas to the activating step. In embodiments, shaping the wax coated catalyst to provide shaped wax coated catalyst comprises shaping the wax coated catalyst into shapes selected from substantially spherical, oblong, tabletted, cylindrical, and combinations thereof. In embodiments, the spray dried catalyst particles have an average particle size of less than about 150 μm.

In embodiments, contacting the spray dried catalyst particles with wax is performed under inert or carbiding atmosphere. The method can further comprise melting the wax from the shaped wax coated catalyst to provide a catalyst slurry. Melting can be performed in a preloading vessel prior to introducing the catalyst slurry into a production reactor. In embodiments, melting is performed subsequent introducing the shaped wax coated catalyst into a production reactor. The method can further comprise operating the production reactor at a temperature above that at which the wax melts.

Also disclosed herein is a method of activating Fischer-Tropsch catalyst particles comprising oxides, the method comprising: contacting the catalyst particles with a reducing gas in an activation vessel to produce an activated catalyst, wherein contacting is performed in the absence of a liquid medium under activation conditions. The method can further comprise selectively removing catalyst fines below an average cutoff size during activation. In embodiments, less than about 5 wt % of the activated catalyst has a particle size of less than 10 μm. In embodiments, selectively removing catalyst fines below an average cutoff size during activation comprises separating the fines from the activation vessel with at least one separation device. In embodiments, one of the at least one separation devices is located at least partially internal to the activation reactor. In embodiments, the at least one separation device is selected from cyclones, filtration units, and combinations thereof. The reducing gas can comprise hydrogen and substantially no carbon monoxide, carbon monoxide and substantially no hydrogen, or both hydrogen and carbon monoxide. In embodiments, the activation vessel is a fluidized bed reactor. The catalyst particles can have an average particle diameter in the range of from 0.5 μm to 200 μm prior to activation. In embodiments, contacting the catalyst particles with a reducing gas comprises suspending the catalyst particles with the reducing gas at a minimum gas velocity of 4 to 10 times the minimum fluidization velocity for the average catalyst particle size prior to activation. The activation vessel can be a fixed bed reactor. In embodiments, the catalyst particles have an average particle size in the range of from about 1 mm to about 5 mm prior to activation.

The method can further comprise maintaining two phase operation throughout the duration of activation by operating at activation conditions at which the non-catalyst contents of the activation vessel remain in the vapor phase. Activation conditions can be selected to minimize the amount of fines, having a particle size less than about 20 µm, generated during activation. The method can further comprise selecting Fischer-Tropsch catalyst particles having an average starting particle size such that the activated particles have an average desired activated particle size. The method can further comprise condensing an activation reactor effluent gas whereby water, hydrocarbons, or both are removed, providing a non-condensed gas comprising reducing gas. In embodiments, the method further comprises recycling at least a portion of the non-condensed gas to the contacting step.

Also disclosed herein is a method of producing hydrocarbons from synthesis gas, the method comprising feeding activated catalyst produced as disclosed herein to a slurry bubble column via a slip stream. In embodiments, no additional activation or synthesis gas treatment of catalyst activated as disclosed herein is performed prior to feeding.

Also disclosed herein is a system for activating a Fischer-Tropsch catalyst, the system comprising: an activation reactor configured to introduce an activation gas to a fixed or fluidized bed of the Fischer-Tropsch catalyst in the absence of a liquid medium; and at least one separation device configured to separate a gas stream comprising entrained catalyst fines having an average particle size below a desired cutoff size from the activation reactor. In embodiments, the activation reactor is a fluidized bed reactor. The cutoff size can be about 10 µm. In embodiments, at least one of the at least one separation devices is located at least partially within the activation reactor. In embodiments, the at least one separation device located at least partially within the activation reactor is selected from cyclones and filters. A cyclone can be at least partially located within the activation reactor. In embodiments, the system further comprises a filtration unit external to the activation reactor, the filtration unit comprising an inlet for the gas stream comprising entrained catalyst fines and configured to separate the catalyst fines from an effluent gas comprising reducing gas. The system can further comprise a dessicant vessel downstream the filtration unit and configured to remove water from the effluent gas, providing a dried effluent gas. In embodiments, the system further comprises a recycle line fluidly connecting the dessicant vessel with the activation vessel, whereby dried effluent gas can be recycled. A filtration unit can be at least partially positioned within the activation vessel. The system can comprise a knock out vessel comprising an inlet for the gas stream comprising entrained catalyst fines and configured to separate the catalyst fines, water, or both from an effluent gas comprising reducing gas. In embodiments, the system further comprises a dessicant vessel downstream the knock out vessel and configured to remove water from the effluent gas, providing a dried effluent gas. The system can further comprise a recycle line fluidly connecting the dessicant vessel with the activation vessel, whereby dried effluent gas can be recycled.

These and other embodiments and potential advantages will be apparent in the following detailed description and drawings. Other uses of the disclosed system and method will become apparent upon reading the disclosure and viewing the accompanying drawings. While specific examples may be presented in the following description, other embodiments are also envisioned. The embodiments described herein are exemplary only, and are not intended to be limiting.

BRIEF DESCRIPTION OF THE DRAWINGS

For a more detailed description of various embodiments of the present invention, reference will now be made to the accompanying drawings, wherein:

FIG. 1A depicts a reactor during fluidization; FIG. 1B depicts a reactor during activation; FIG. 1C depicts a reactor during coating; and FIG. 1D depicts a reactor during draining and/or shaping.

NOTATION AND NOMENCLATURE

Figure 1:
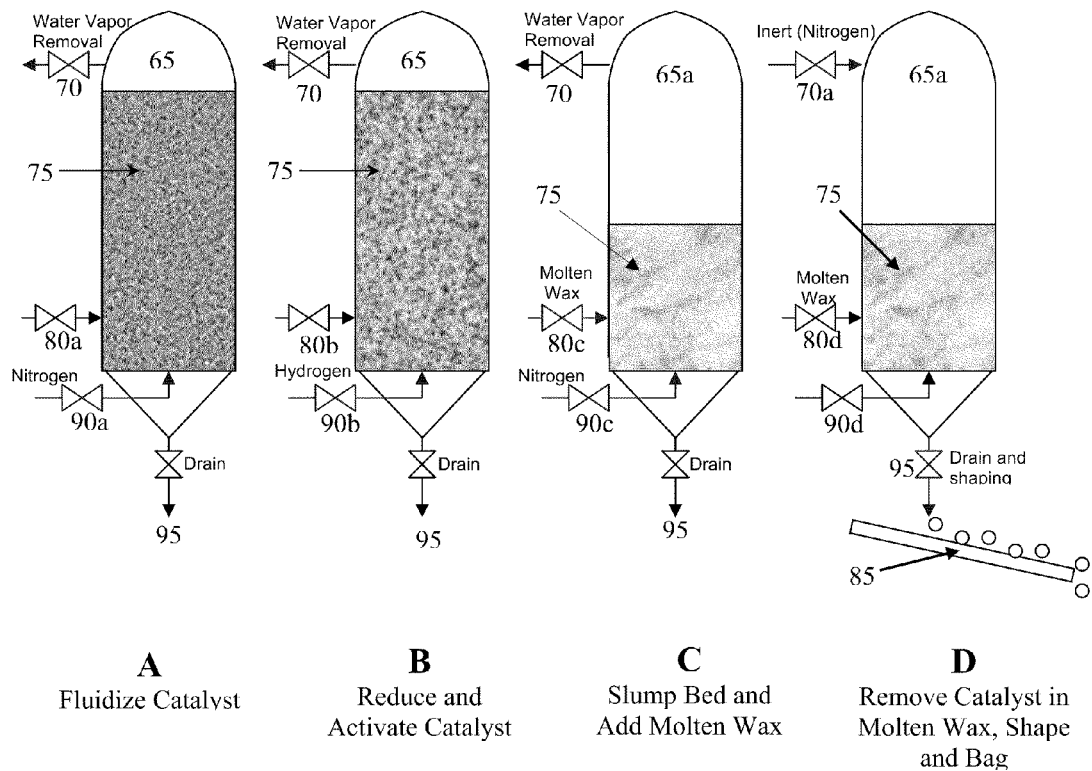
FIGS. 1A-1D are schematics of a suitable reactor for use in a system according to an embodiment of this disclosure at various stages of a process for activating catalyst according to an embodiment of this disclosure.

As used herein, the terms 'activating' and 'activation' are used to refer to producing a catalytically active form of a catalyst. In embodiments, such 'activating' and 'activation' may comprise reducing a Fischer-Tropsch catalyst comprising iron oxides in the presence of a reducing gas such that oxide forms thereof (e.g., hematite-$Fe_2O_3$ and/or magnetite-$Fe_3O_4$) are converted to active carbide forms (e.g., Hägg carbide-$Fe_5C_2$). As such, 'activating' and 'activation' may include contacting oxide forms of the catalyst with a gas such as hydrogen, carbon monoxide or synthesis gas whereby carburization of the catalyst occurs.

The abbreviation 'FT' is utilized herein to represent 'Fischer-Tropsch.'

Unless otherwise noted, use of the term 'fines' is intended to refer to particles below a desired particle size, regardless of whether that size is traditionally considered to comprise fines.

DETAILED DESCRIPTION

Overview. Herein disclosed are a system and method for providing catalyst to a reactor. In embodiments, the system and method allow for in-situ activation (e.g., carbiding) and wax coating of the catalyst particles. In embodiments, a conventional process for the reduction and transportation of fixed bed precipitated iron catalysts is adapted for utilization in a precipitated iron slurry phase application. In embodiments, the system and method provide for sequential activation (e.g., reduction and/or carbiding) and protection (e.g. coating with wax) of precipitated iron catalyst as used in a Fischer Tropsch process. In embodiments, the catalyst is a spray dried catalyst suitable for slurry phase Fischer-Tropsch catalysis.

Although described with reference to activation and wax coating of Fischer-Tropsch catalysts, it is to be understood that many of the teachings herein may be suitable for activating, sizing and/or facilitating handling of a variety of catalysts. For example, herein disclosed is a method of protecting a spray dried catalyst to maintain reduction/activity thereof and/or to facilitate handling and transport of the catalyst to a reactor in which it will be utilized to catalyze a reaction. Although description of this method will be made with respect to Fischer-Tropsch catalyst suitable for use in a Fischer-Tropsch synthesis reactor, it is to be understood that the disclosed method may be applicable to other varieties of catalyst.

As mentioned hereinabove, iron catalyst having a size of 2-3 mm has conventionally been reduced in hydrogen and coated in wax for transport to activation reactors. Such a procedure is challenging with spray dried catalyst particles which may have an average particle size in the range of 40-150 or 40-120 microns, depending on reactor size. Certain small, spray dried catalyst particles readily combust when oxygen is present. Thus, removing such particles from a reduction reactor may create highly reactive catalyst dust. Via this disclosure, activation can be performed to ensure that the catalyst is in a more stable form (i.e., more oxygen resistant) to be wax coated. Such activation may comprise, for example, hydrogen reduction followed by synthesis gas precarbiding/activation. The protected (i.e., coated) product can be shaped as desired to assist in handling, for example transporting and loading into a synthesis reactor (i.e., a Fischer-Tropsch reactor). In alternative embodiments, spray dried catalyst particles are coated with wax prior to activation (e.g., prior to reducing or prior to precarbiding but subsequent reducing). In applications, the coated catalyst is formed into small spheres or otherwise pelletized. Such pelletization may significantly shorten the time needed to get the synthesis reactor(s) on-line, due to more convenient handling of the pelletized catalyst relative to non-pelletized (e.g., spray dried) catalyst. The process may also increase the stability of operation during catalyst removal from and/or replacement within a reactor.

System for Catalyst Coating. Herein disclosed is a system suitable for providing a protective coating to a catalyst. The system may be particularly well suited for coating spray dried catalyst particles. The system comprises one or more fixed or fluidized bed reactors. FIGS. 1A-1D are schematics of a suitable reactor(s) 65/65a for use in the system in an embodiment of this disclosure at various stages of a method for activating catalyst according to this disclosure. FIG. 1A depicts a reactor 65 during fluidization; FIG. 1B depicts reactor 65 during activation; FIG. 1C depicts a reactor 65a during coating; and FIG. 1D depicts reactor 65a during draining and/or shaping. Reactors 65 and 65a may be the same or different.

Reactor 65/65a comprises at least one gas inlet 90a-d configured to introduce gas into reactor 65/65a, at least one outlet 70/70a positioned in an upper portion of reactor 65 and configured for removal of a gas and/or vapor from reactor 65/65a, and an outlet 95 within a lower portion of the reactor and configured for removal of catalyst therefrom. One or more gas inlets 90a, 90b, 90c, and/or 90d are positioned near the bottom of the reactor for introducing gas into the reactor and may introduce the gas via a distributor, as known in the art. The reactor also comprises one or more inlets 80a, 80b, 80c, and/or 80d whereby catalyst slurry, catalyst, wax (e.g., solid or molten wax), or other components may be introduced into the reactor. In embodiments, the system comprises a single reactor 65, and the reactor comprises an inlet 80 for solid or molten wax selected to coat the catalyst and an inlet for catalyst particles. Inlets 80 may be positioned within an upper, middle or lower portion of the reactor.

Reactors 65/65a may be fixed bed reactors or fluidized bed reactors. In embodiments, the system comprises a single fluidized bed reactor, in which activation and wax coating are performed. In embodiments, the system comprises two reactors, a first reactor adapted for catalyst activation, and a second reactor adapted for wax coating of the catalyst. Thus, in embodiments, the system comprises two reactors, an outlet 95 of a first reactor fluidly connected to an inlet 80 of the second reactor, whereby activated catalyst is transferred to the second reactor for coating with wax. For example, in such embodiments, reactors 65 and 65a may be different reactors. In other embodiments, activation and wax coating are performed in the same reactor and reactors 65 and 65a are the same reactor.

The system may further comprise shaping apparatus, indicated in FIG. 4D as component 85, configured to shape the wax coated catalyst extracted from the reactor(s) 65/65a. Such shaping apparatus 85 may include pelletizing apparatus, as known in the art, configured to produce spheres, cylinders, or other-shaped catalyst units. The shaping apparatus 85 may provide catalyst units having a size in the range of from about 40 to about 150 microns, from about 40 to about 140 microns, from about 40 to about 130 microns, from about 40 to about 120 microns, greater than 40 microns, greater than 50 microns or greater than 60 microns. Desirably, the shaping apparatus 85 provides catalyst units that are easily handled for transport to and/or loading of a production reactor (e.g. an FT synthesis reactor).

As discussed further hereinbelow, embodiments of the system may comprise apparatus configured for classifying catalyst particles during catalyst activation. In such embodiments, the system may comprise associated catalyst particle sizing apparatus in addition to an activation reactor 65/65a. It is to be understood that a system comprising the activation and catalyst sizing apparatus as described with respect to FIGS. 2 and 3 hereinbelow may be utilized without the utilization of wax coating and shaping apparatus 85 of FIG. 1D. That is, the system herein disclosed may be used to activate and size catalyst, to coat a non-activated catalyst with wax, to activate and subsequently coat a catalyst with wax, or to activate, size, and protect a catalyst via wax coating.

Figure 2:
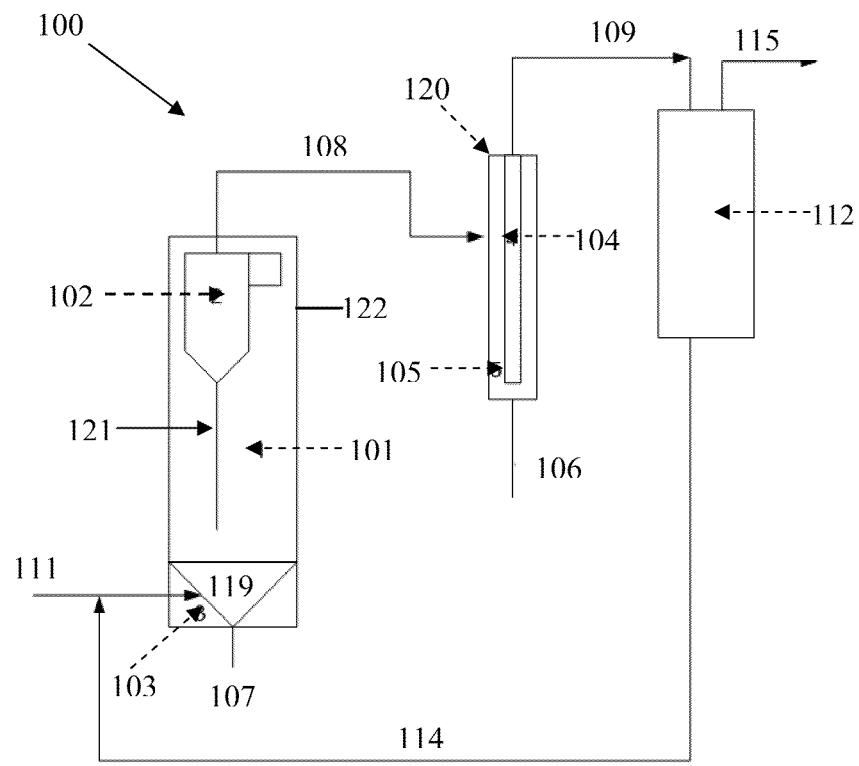
FIG. 2 is a schematic of a system suitable for activating and sizing a catalyst according to an embodiment of this disclosure.

FIG. 2 is a schematic of a system 100 suitable for activating and sizing a catalyst according to an embodiment of this disclosure. System 100 comprises activation reactor 101, internal separation unit 102, external separation unit 120, and downstream vessel 112. Reactor 101 comprises gas inlet 111 configured for introducing a gas into reactor 101. Desirably, gas inlet 111 is positioned in a lower portion of activation reactor 101. Activation reactor 101 comprises a distributor 119, which may be, for example, a porous metal plate. Distributor 119 may be, for example, cone-shaped. Gas inlet 111 may be configured to introduce gas into a plenum 103 below distributor 119. Activation reactor 101 comprises an outlet 107 for activated catalyst, and may comprise an inlet 122 for loading catalyst.

Internal separation unit 102 is any separator capable of separating catalyst particles below a cutoff size (referred to herein as 'fines') from the remainder of the particles therein. In embodiments, internal separation unit 102 is a cyclone positioned at least partially within activation reactor 101. Cyclone 121 may comprise a dipleg 121. In embodiments, internal separation unit 102 is configured to separate fines having a size of less than 10, 15, or 20 microns from activation reactor 101, however, the internal separator may be selected and/or designed based on whatever size catalyst particles are to be removed from activation reactor 101, i.e. according to the desired cutoff size.

In the embodiment of FIG. 2, system 100 further comprises external separation unit 120. External separation unit 120 is fluidly connected to activation reactor 101 via line 108, which connects internal separator 102 therewith, such that fines separated via internal separation unit 102 may be introduced into external separation unit 120. External separation unit 120 may comprise any separator capable to separate fines from the gas in which they are entrained and introduced into external separator 120. In embodiments, external separation unit 120 is configured to separate fines having a size of less than 10, 15 or 20 microns from gas. In embodiments, external separation unit 120 is configured to separate substantially all solids from gas. A gas line 109 is configured to carry gas separated from fines/solids in external separator 120, while an outlet 106 is configured to discharge undesirable catalyst fines from external separator 120. In embodiments, external separator 120 is capable of producing a substantially solids-free offgas, which exits external separator 120 via gas outlet line 109. Gas outlet line 109 may be positioned at or near the top of external separator 120, while outlet 106 may be positioned within a lower portion or substantially at the bottom of external separator 120. The external separator may comprise, for example, a filtration apparatus comprising a housing 105 and one or more filter elements 104.

In embodiments in which activation produces water, system 100 may further comprise downstream vessel 112, fluidly connected with external separation unit 120. Downstream vessel 112 is configured to separate water produced during activation from gas. For example, downstream vessel 112 may comprise a dessicator vessel, containing therein a dessicant as known in the art. In embodiments, the system comprises two or more downstream dewatering vessels 112, configured such that one may be in operation while the other is in regeneration mode. Vessel 112 may comprise a bleed gas line 115, such that impurities accumulated in the gas may be removed from the system. Line 114 is configured for removing dried offgas from vessel 112. In embodiments, vessel 112 is configured such that the offgas in line 114 has a dewpoint of not more than −40° C. In embodiments, line 114 may connect with activation gas inlet line 111, whereby activation gas may be recycled to activation reactor 101.

Figure 3:
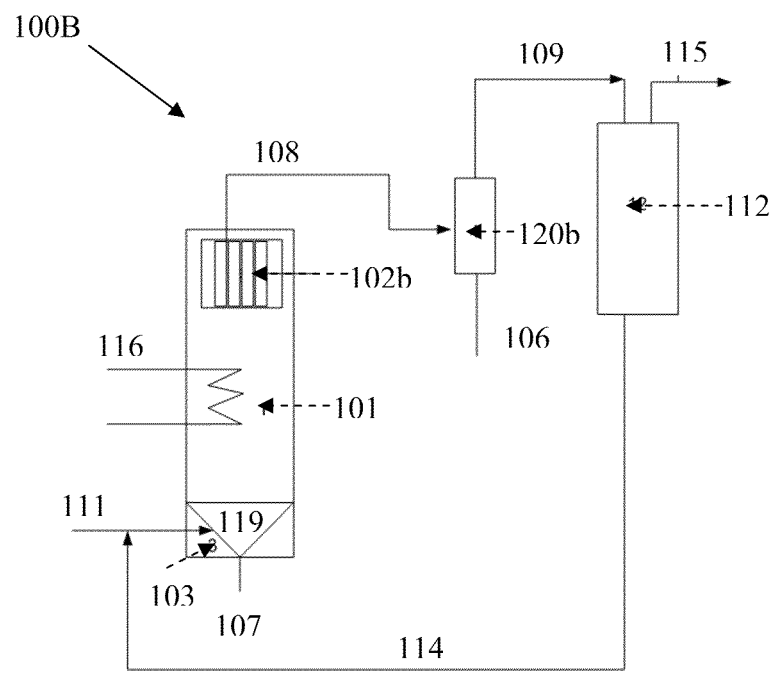
FIG. 3 is a schematic of a system suitable for activating and sizing a catalyst according to another embodiment of this disclosure.

In embodiments, catalyst activation and sizing is performed with a system such as system 100B depicted in FIG. 3. In this embodiment, the internal separation unit 102b comprises a filtration assembly. The pore size of the filter elements within filtration assembly 102b are selected to control the desired particle size retained within activation reactor 101. For example, filtration assembly 102b may comprise a 2 μm element, whereby catalyst particles larger than 2 μm will be retained within activation vessel 101 during activation (e.g., reduction). In system 100B, external separator 120b comprises a knock out vessel configured to capture entrained fines (i.e., particles introduced thereto via line 108) and discharge the particles along with any water product via exit line 106. Again, the system may comprise one or more downstream vessels 112 configured to dry the activation gas (e.g., reducing gas) that may contain water vapor or free water. In embodiments, vessel 112 is configured such that the offgas has a dewpoint of not more than −40° C.

In embodiments, an activation and sizing system 100/100B is combined within a coating system as indicated in FIG. 1. In such embodiments, activation reactor 101 may be adapted for slumping of the catalyst therein following activation and combination with wax coating as described with respect to FIG. 1. In other embodiments, activation reactor 101 is one of two reactors 65 (in FIG. 1) and is positioned upstream of a second reactor 65a adapted for coating the catalyst with wax, as depicted in FIG. 1C. In such embodiments, activated catalyst from activation reactor 100/100B is introduced into a dedicated coating vessel 65a for catalyst coating with wax.

In embodiments, a catalyst coating system further comprises one or more product synthesis reactors, such as Fischer-Tropsch synthesis reactors, in which a catalyst coated as described hereinbelow, an activated and sized catalyst, or an activated, sized and coated catalyst is utilized for production of the product for which the catalyst catalyzes the reaction. In instances, wax coating is removed from a coated catalyst in a preloading vessel configured to melt the coating and separate the catalyst from the coated catalyst. If the catalyst was activated prior to coating, the catalyst may be introduced directly into a synthesis reactor, for example, via a slip stream, with no further activation (e.g. no further synthesis gas treatment). If the catalyst was not activated prior to wax coating, the wax coated catalyst may be loaded into an activation reactor and activated prior to introduction into a synthesis reactor, or the catalyst may be activated in situ within a synthesis reactor.

Figure 4:
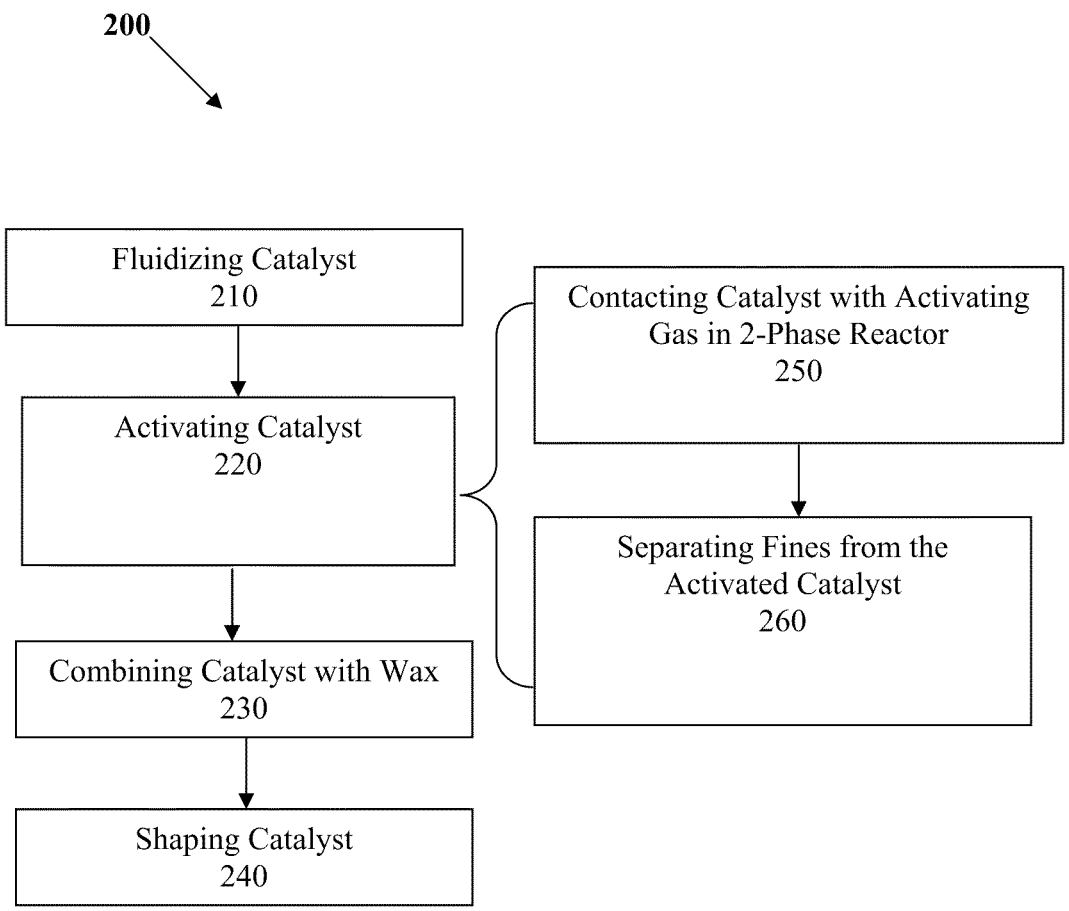
FIG. 4 is a flow diagram of a method of producing catalyst for transport to a product synthesis reactor according to an embodiment of this disclosure.

Process for Coating, Activation and/or Sizing of Catalyst. Herein disclosed is a method of preparing a catalyst for subsequent transport and/or utilization. FIG. 4 is a flow diagram of a method 200 of producing catalyst (e.g., FT catalyst) for transport to a product synthesis reactor (e.g., an FT reactor), according to an embodiment of this disclosure. Method 200 comprises: fluidizing spray dried catalyst particles 210; combining the catalyst particles with wax 230; and shaping the wax-coated catalyst 240. Method 200 may further comprise activating the fluidized catalyst 220. Activating the catalyst 220 may be performed prior to or subsequent to shaping the wax-coated catalyst 240. In embodiments, activating the catalyst 220 comprises contacting catalyst with activating gas in a two-phase reactor 250 and separating fines from the activated catalyst 260, as further described below.

Fluidizing catalyst 210 may comprise fluidizing spray dried catalyst particles. In embodiments, the fluidizing gas comprises nitrogen. In other embodiments, the fluidizing gas comprises synthesis gas. In embodiments, the fluidizing step 210 is part of the step of activating 220. The spray dried catalyst particles may comprise FT catalyst. The spray dried catalyst particles may comprise iron-based FT catalyst. In embodiments, the spray dried catalyst particles comprise iron-based precipitated FT catalyst. The spray dried catalyst may have a size in the range of from about 40 to about 150 μm. The spray dried catalyst may have an average particle size of 40-150 μm, 40-125 μm, 40-100 μm, or 30-80 μm. In embodiments, the average size of the spray dried catalyst particles is less than about 3 mm, 2 mm, 1 mm, 500 μm, 400 μm, 300 μm, 200 μm, 150 μm, 125 μm, 100 μm or less than about 80 μm.

Covering the catalyst with wax may protect activated catalyst (e.g., reduced/carbided catalyst) from oxidation. The flow properties of small spray dried catalyst particles are significantly different from those of larger (e.g., 1-3 mm) catalyst conventionally used in fixed bed reactors. With small catalyst particles, it is not feasible to just dump the catalyst into wax under gravity. Via embodiments of this disclosure, catalyst activation, i.e. carbiding, can be completed at the catalyst manufacturing site, providing the advantage of simpler startup of a fresh reactor batch. A further, and possibly more significant, advantage is evident during on-line catalyst removal and replacement. Via this embodiment, activated catalyst may be readily available for loading into the reactor, reducing the needed reaction equipment (e.g., dedicated activation vessels) and/or process time (e.g., time lost for activation) required at a FT plant. The surrounding wax coating may be melted from the pre-activated catalyst particles and the activated catalyst introduced directly into a synthesis reactor (e.g., a FT reactor), for example via a slipstream.

Further description of the method according to an embodiment of this invention will now be made with reference to FIG. 1. In FIG. 1A, spray dried catalyst particles are fluidized 210. Spray dried catalyst may be introduced to reactor 65 via an inlet 80*a*, forming catalyst bed 75. Inlet 80*a* may be positioned in an upper, lower, or middle portion of reactor 65 whereby catalyst particles are introduced into an upper, middle, or lower portion of reactor 65. Fluidizing may be performed, for example, by introducing an inert gas (e.g., nitrogen) into a reactor 65 via gas inlet 90*a*. Gas inlet 90*a* is desirably positioned within a lower portion of reactor 65, and introduces gas via a distributor, as known in the art.

Indicated in FIG. 1B, the fluidized catalyst particles in the catalyst bed 75 may be activated (e.g., reduced and carbided) using appropriate gas for the selected catalyst. In embodiments, activating catalyst at 220 comprises contacting the catalyst with a reducing gas. For example, spray dried catalyst particles comprising iron oxide may be reduced in reducing gas (e.g., hydrogen) using a fixed bed or fluidized bed reactor. Reducing gas may be introduced into reactor 65 via gas inlet 90*b* which may be the same or different from gas inlet 90*a* of FIG. 1A. Reduction may be performed at a temperature of 260-285° C., or from 260-285° C. for a time period in the range of from about 4 to about 24 hours. The reducing gas can be CO, $H_2$, or a proper mixture of the two. In embodiments, the reducing gas comprises synthesis gas having a high ratio of hydrogen to carbon monoxide. In embodiments, the ratio of hydrogen to carbon monoxide in the activation gas is in the range of from about 0.3:1 to about 10:1, from about 0.8 to about 2.0 or from about 0.9 to about 1.1. In embodiments, activation comprises contacting spray dried FT catalyst comprising iron oxide with gas comprising carbon monoxide (may comprise substantially no hydrogen).

In embodiments, activating 220 comprises contacting the catalyst with a reducing gas and subsequently contacting the reduced catalyst with another activation gas. For example, catalyst may be reduced and subsequently carbided (i.e., activated) by contact with an activation gas. Activation gas may be introduced via a gas inlet, which may be the same or a different gas inlet from the gas inlet utilized for introduction of reducing gas. The activation gas may be selected from hydrogen, carbon monoxide, synthesis gas, and combinations thereof The activation gas may comprise a high hydrogen to carbon monoxide ratio synthesis gas. Activation may take place in the same or different fixed or fluidized bed reactor from that in which reduction is performed in some embodiments. Depending on the reactor, activating catalyst 220 may comprise cutting in hydrogen and reducing for from about 4 to about 8 hours, or from about 4 to about 24 hours, and then switching to synthesis gas with a suitable ratio or other activation gas for from about 4 to about 24 hours, or from about 4 to about 8 hours to activate the catalyst.

As indicated in FIG. 1C, the activated catalyst may then, under an inert atmosphere (or carbiding atmosphere), be transferred to a wax coating vessel 65*a*, or may be combined with wax in the same vessel 65. Combining the catalyst particles with wax 230 may comprise introducing molten wax into the vessel, for example via inlet 80*c*, or adding solid wax to the vessel via inlet 80*c* and heating whereby the wax melts and coats the (air-sensitive) catalyst therein. Molten wax may be introduced into reactor 65/65*a* via wax inlet 80*c*. Inlet 80*c* may be the same or different from the inlet 80*a* utilized to load the reactor with catalyst prior to activation. In embodiments, the fluidized bed 75 is slumped prior to the addition of wax to the reactor. In embodiments, the fluidized bed 75 is slumped following activation and prior to the addition of wax to reactor 65. The wax coating may be any suitable wax from any suitable source. In embodiments, the wax coating is selected from petroleum wax, FT wax, paraffin wax, and wax from any other animal or plant source. Melted wax may be introduced or a solid wax melted within a coating vessel 65/65*a* at a temperature of greater than the melting point of the wax. If the wax is a C40+ and is solid, it may be melted before or after introduction into the reactor. If the wax is C20+ or C30+ and is a liquid at room temperature, it may be loaded into the reactor, without additional heating, as a liquid.

As indicated in FIG. 1D, wax coated catalyst is shaped at 240. Shaping 240 may comprise draining molten wax-covered catalyst from reactor 65/65*a*, for example via drain 95 and shaping/cooling into a stable state for transportation and/or loading to a commercial (e.g. FT) reactor. Draining of coated catalyst may be promoted by introducing an inert gas, such as but not limited to nitrogen, via a gas inlet 70*a*. Shaping 240 may be performed by any suitable shaping apparatus, indicated in FIG. 1D as component 85, as known in the art. For example, the wax coated catalyst may be shaped (e.g., pelletized) into pellets. The pellets may be roughly or substantially spherical, oblong, tabletted or other shape suitable for transportation and ease of loading into a commercial reactor.

In embodiments, method 200 comprises combining spray dried catalyst particles with wax 230, and shaping the wax coated catalyst 240. In embodiments, shaped catalyst may be provided to a commercial reactor prior to activation. In applications, shaped wax-coated catalyst is introduced into an activation reactor or a synthesis reactor where the catalyst may be activated in situ. The wax is then melted and activation carried out as desired. Again, activation may be performed with hydrogen, carbon monoxide, or a combination thereof. Activation may be performed with a high hydrogen:carbon monoxide ratio synthesis gas. Thus, it is envisioned that catalyst activation may be performed prior to or after catalyst wax coating/shaping.

Two-Phase Catalyst Activation and/or Sizing. As indicated in FIG. 4, activating catalyst 220 may further comprise contacting catalyst with activating gas in a two-phase reactor 250 and/or separating fines from the activated catalyst 260. This two-phase processing, which does not involve a liquid medium, provides for direct contact between activating gas (e.g. reducing gas) and catalyst to provide enhanced interaction relative to interaction in a three-phase activation process. Mass transfer is not limited when the activation (e.g. reduction) is conducted in a two-phase environment. Additionally, separating fines from the activated catalyst 260 (i.e., particle classification) may be incorporated into method 200 to allow fines to be removed during the activation process. Removing fines during upstream activation (i.e., prior to FT synthesis) makes the downstream product production process easier to operate, may reduce operating costs significantly and/or may extend the on-stream time of a system.

To effectively activate a spray dried iron catalyst for use in a Fischer Tropsch reactor, the catalyst is placed in a fluidized bed vessel, whereby the catalyst is evenly distributed by an upward reducing gas. As mentioned above, during the reduction, the catalyst physical and chemical properties are changed according to the reduction temperature, gas type, pressure, and gas hourly velocity. Particularly, catalyst fines are formed and alienated from the original catalyst matrix. According to the embodiments of FIGS. 2 and 3, particle size control devices, including, but not limited to, filters and cyclones, are utilized to remove these fines. FIGS. 2 and 3 provide two embodiments of systems suitable for activating catalyst 220. In embodiments, greater than 80%, greater than 90%, or greater than 95% extent of reduction is achieved. In embodiments, a separation device such as cyclone or filter may be installed inside or outside of the activation (e.g. reduction) vessel to classify the particle matrix. The activation reaction may be performed in a continuous mode, with the particle size changing as a function of time and the degree of catalyst reduction. In embodiments, incorporation of classification devices into the activation allows (i.e., constant) removal of undesired fines, e.g. catalyst particles less than 1-3 μm, 10, 15 or 20 μm in diameter. As discussed above, the fines can be defined based on the final desired particle size distribution of the activated catalyst. Iron catalyst activation utilizing a two-phase reactor as will now be described allows efficient contact of catalyst particles with activating gas. The direct contact of reducing gas and catalyst particles accelerates the mass transfer process and increases the effectiveness of the activation. Furthermore, incorporation of particle segregation devices in the activation process may be used to significantly, perhaps substantially completely, remove the catalyst fines upstream of a production reactor (e.g. a Fischer Tropsch synthesis reactor).

Description of a method of activating catalyst 220 will now be made with reference to FIG. 2, which is a schematic of an activation system 100. Again, although the two phase activation disclosed herein may be suitable for use with a variety of catalysts, description will be made with reference to iron FT catalyst. Dried (i.e. substantially dry) iron catalyst is loaded into an activation (e.g., reduction) vessel 101. Catalyst may be loaded via an inlet 122. Reduction vessel 101 contains at least partially therein internal separation apparatus 102. Separation apparatus 102 may be, for example, a cyclone. In embodiments, the loading volume is such that catalyst covers the cyclone dipleg 121 when the catalyst is expanded by the activation (i.e., reducing) gas. Reducing gas is introduced via line 111 and may enter a plenum chamber 103. A cone-shape porous metal or equivalent metal plate 119 located at the bottom of reduction vessel 101 supports the catalyst and evenly distributes the reducing gas. Reducing gas passes through the distributor 119 and lifts up the catalyst (e.g. iron oxide catalyst). In embodiments, the superficial vapor velocity of the activating gas is in the range of from about 3 to about 4 times the minimum particle fluidization velocity. Under desired activation temperature and pressure, the iron catalyst is activated for a fixed period of time. The off gas with entrained catalyst fines enters internal separator 102, which may be a cyclone, which retains large catalyst within activation vessel 101 while small catalyst 'fines' continue traveling through line 108 to external separator 120.

External separator 120 may be, for example, a filtration device. In embodiments, external separator 120 is a filtration device comprising a housing 105 containing specified filter element(s) 104. The selection of filter element(s) 104 depends on the desired particle size. Undesirable catalyst fines generated during the activation process are discharged via discharge exit line 106. Substantially solid-free off gas may subsequently enter one or more downstream vessels 112 via line 109. Vessel(s) 112 contains desiccants effective for absorbing any water in the solids-free off gas. Such water may have been produced during the activation (e.g. reduction) reaction in activation vessel 101. For example, as mentioned above, water is detrimental to Fischer-Tropsch catalyst and undesirably promotes re-oxidation of catalyst and other undesirable reactions. In such applications, a dewatering step is desirably incorporated into the process. Two desiccant vessels 112 may be utilized in parallel for commercial scale systems and methods. In such embodiments, one dessicant vessel will be in service and the other one in regeneration mode during system operation. After passing through desiccant vessel(s) 112, all or a portion of the dried off gas may be recycled via line 114 and combined with fresh reducing gas in line 111, thus re-entering reduction vessel 101. A bleed gas line 115 may be used to reduce any impurities that accumulate in the reducing gas recycle loop during the course of activation.

In the embodiment of FIG. 2, an internal cyclone 102 with an external filtration device 120 allows fines to be carried over the top of a fluidized bed vessel 101. The catalyst particles retained in vessel 101 continue to be activated (e.g. reduced) to achieve desired activation (e.g. reduction). The design of cyclone and filter can be carefully selected for a desired particle size classification.

An alternative arrangement is shown in FIG. 3, which is a schematic of a system 100B for activating catalyst 220 according to another embodiment. In the embodiment of FIG. 3, external separator 102b comprises a filter assembly installed at least partially inside activation (e.g. reduction) vessel 101. The pore size of the filter elements within the filtration assembly are selected to control the desired particle size retained within reduction vessel 101. For example, if a 2 μm element is chosen, any particle size that is larger than 2 μm will be retained in reduction vessel 101 during the entire reduction process. Entrained particle fines captured in the filter assembly are introduced via line 108 into external separator 120b. External separator 120b may comprise a knock out vessel. Within the knock out vessel, fines are separated from reducing gas. Fines exit knock out vessel 120b with product water via line 106. Line 109 introduces gas into vessel 112, which is a water absorbent reactor operable to dry out the reducing gas that may carry with it water vapor or free water. In embodiments, the dew point of the off-gas in line 114 is less than about −40° C. After a period of time, activated catalyst is discharged from line 107.

Dried, activated catalyst powder may be mixed with liquid medium prior to charging a production reactor (e.g. a Fischer-Tropsch reactor), or may be combined with wax 230 and shaped 240 as discussed hereinabove to protect the activated catalyst for transport and/or handling (i.e. Fischer-Tropsch synthesis reactor loading).

In embodiments wherein activation comprises reduction, the heat of reaction should be monitored during the reduction to ensure that the temperature of reaction will not exceed the design temperature of activation vessel 101. Depending on the type of reducing gas, reduction vessel 101 may require one or more internal and/or external heat exchanging device (s) to remove the reaction heat. Thus, as indicated in FIG. 3, reduction vessel 101 may contain a heat removal device 116 therein. The cooling coils can be designed and arranged such that attrition caused by physical contact is minimized.

Additionally, by-products that may form during the activation should be avoided. For example if synthesis gas is used for reduction of iron FT catalyst, at temperature and pressure, the CO and $H_2$ will react to form hydrocarbons within reduction vessel 101. Operation should be performed such that the hydrocarbons remain in the vapor phase within reduction reactor 101 and do not condense, as formation of liquid hydrocarbons within reduction vessel 101 may hinder the ability of gas distributor 119 to provide proper fluidization. In embodiments, a knock out drum is positioned in the overhead line to remove hydrocarbons from the off-gas before recycling to reduction vessel 101.

The advantage of the two-phase activation 250 is that there is no liquid medium used in this reduction process. The reduction vessel 101 is a two-phase (gas plus solid) reactor. The reducing gas and catalyst contact efficiency is high in the absence of liquid medium resistance. In addition, the built-in cyclone and filtration applications of FIGS. 2 and 3 can be used to provide pre-classified activated catalyst. Catalyst activated and sized via this method may be smaller sized (e.g. less than 150 μm) spray dried catalyst suitable for slurry bubble column or fluidized bed usage or may be larger sized (e.g. 1-3 mm) catalyst suitable for fixed bed usage. Catalyst fines stem from the original oxide matrix during the manufacturing process and are also generated by the activation process. The use of the system and method of FIGS. 2 and 3 combine activation with particle size classification (i.e., fines removal). Via this system and method, water produced during the reduction may be effectively removed to expedite the reduction process and prevent/minimize re-oxidation and fines may be removed prior to subsequent process steps (i.e., prior to introduction of catalyst into an FT reactor or prior to wax coating 230 and catalyst shaping 240 for transport/ease of handling). The disclosed system and method provide benefits over the prior art, whereby catalyst fines are conventionally mixed in the slurry following the reduction process and subsequently charged into the FT reactor along with water produced during activation.

Although, as mentioned hereinabove, it has been reported that high pressure activation with synthesis gas in a 3-phase reactor is unfavorable due to inefficient water removal, this does not pose any problem in the two phase fluid-bed or fixed bed reactor activation described herein since water may be easily removed via these systems and methods. Catalyst activation as disclosed herein that allows the water to be removed during the activation process offers advantages over prior art activation processes, in which the water product is generally mixed with FT product when using an in situ activation process. As noted hereinabove, the presence of water in the FT reactor may undesirably speed up FT catalyst deactivation as described in the prior art.

Fischer-Tropsch Catalyst. The disclosed system and method are applicable to a variety of catalysts requiring activation by contact with a gas and/or whose size is such that catalyst loading/handling are difficult. In embodiments, the catalyst treated as disclosed herein is a Fischer-Tropsch catalyst effective for catalyzing the conversion of carbon monoxide and hydrogen into $C^{2+}$ hydrocarbons. According to this disclosure, an FT catalyst can be coated in wax for transport/ease of reactor loading and/or activated/sized according to this disclosure. In embodiments, activating is performed in a two-phase reactor prior to or subsequent catalyst coating with wax. In embodiments, catalyst activation is performed concomitantly with catalyst sizing such that fines are removed from the activated catalyst during the activation. In embodiments, the FT catalyst comprises cobalt. In embodiments, the catalyst comprises iron. A suitable iron-based Fischer-Tropsch catalyst is disclosed in U.S. patent application Ser. No. 12/198,459, which is hereby incorporated herein to the extent that it provides details or explanations supplemental to those disclosed herein. The catalyst may be a precipitated iron catalyst suitable for Fischer Tropsch processes. In applications, the catalyst particles comprise a spray dried FT catalyst for utilization in a slurry phase.

The catalyst protected via wax coating and/or activated/sized via the systems and method of this disclosure may subsequently by utilized in a FT process to produce liquid hydrocarbons. During Fischer-Tropsch conversion, the percent by weight of the disclosed iron catalyst in the Fischer-Tropsch reactor slurry (for example, in a slurry bubble column reactor, or SBCR) may be in the range of from 5 to 25 percent by weight of iron in the slurry, in the range of from 210 and 25 percent by weight, or about 20 percent by weight of the slurry.

Features/Advantages. Coating of a catalyst as disclosed herein allows for facilitation of activation (e.g. reduction) and transportation of precipitated iron catalysts. This method is superior to traditional processes, as the method allows for easy handling of catalyst and loading of a reactor therewith. Such catalyst coating is novel to application with a precipitated spray dried slurry phase iron-based catalyst.

In embodiments, the system and method are utilized to protect catalyst via wax coating. Pelletizing of catalyst may facilitate reactor loading. In embodiments, the catalyst is coated/pelletized after activation, allowing reduced start-up time, as no further activation is required prior to use. This may eliminate the need for a catalyst activation reactor at an FT plant site, and therefore reduce the capital cost associated with an FT plant. Alternatively, the spray dried catalyst particles are coated with wax/pelletized prior to activation. In this instance, coating allows for easier handling/catalyst loading, and activation may be performed in situ in an FT reactor or in a dedicated activation reactor prior to production. In embodiments, a method of protecting catalyst comprises sequential reduction, activation and protection of catalyst with wax. The spray dried catalyst particles may be coated in wax, in situ, before or after activation (e.g., carbon monoxide, hydrogen or syngas activation).

As mentioned hereinabove, conventional FT catalyst activation is accomplished by mixing iron oxide (e.g., hematite) phase catalyst particles with liquid medium comprising hydrocarbons, such as but not limited to FT wax, paraffin or oils, such as Durasyn®, and reducing the catalyst with synthesis gas (comprising carbon monoxide and hydrogen), CO, or $H_2$. The reduction process involves dissolving a reducing gas in the liquid medium whereby reducing-gas-saturated liquid enters the catalyst pores and surfaces to activate the catalyst. This process generally involves at least two transfer steps to obtain the reduced catalyst particles. After the reduction, the catalyst is conventionally transferred directly into a slurry bubble column reactor for synthesis. However, the activation process causes the breakage of catalyst due to the carburization which leads to the variation of catalyst particle density. According to embodiments of this disclosure, gas alone is utilized for the activation process. The advantage of a gas-only activation process is to increase the efficiency of the activation process without the additional mass transfer limiting step of passing the gas through a liquid medium.

In embodiments, installation of classification devices inside and/or outside of an activation vessel facilitates catalyst particle classification. The activated catalyst is selectively separated and may be transferred directly to a slurry bubble column or other downstream reactor or coated with wax for transport and/or storage. During FT synthesis, the presence of fines can hinder the downstream wax product separation and create operational challenges for the product upgrading process. The disclosed activation/sizing system and process allow for significant reduction in the amount of catalyst fines introduced and/or formed within the FT reactor, which may ease downstream settler and/or filtration operations, allowing for ease of operation and minimize shutdown. Additionally, when catalyst is activated/sized and subsequently coated with wax, the catalyst may be introduced into an FT reactor without requiring down time for activation.

The invention is not limited to the number or combination of specific units shown in the attached Figures and specifically discussed herein.

EXAMPLES

Example 1

A lab activation process utilizing synthesis gas and liquid medium indicated that there is a significant particle size distribution difference before and after the activation. The activation conditions comprised a temperature of 275° C., a pressure of 140 psig, and an gas hourly space velocity of 2.5 L/g/hr. Activation was performed for a period of 6 hours.

TABLE 1

Percent Finer Diameter (μm)

| % | Before Activation | After Activation |
|---|---|---|
| 90 | 54.55 | 28.9 |
| 50 | 29.94 | 8.092 |
| 10 | 12.38 | 0.723 |

As seen in Table 1, the 50% finer particle diameter shifts from 30 μm to 8 μm upon activation. The mean particle diameter was 32 μm before activation and 12 μm after the activation process. The disclosed system and method may be used to reduce the percentage of fines introduced into a downstream FT reactor.

Example 2

Performance was studied in a continuous stirred tank reactor (CSTR) and an example is given in Table 2 below.

TABLE 2

CSTR Reactor Performance Markers
for Catalyst Coated as Described Herein
Relative to Other Prior Art Activation Schemes
(Similar Reaction Conditions: 255° C., 375 psig)

| Catalyst | Activation type | Activation temperature, ° C. | % CO conversion at 75 h | % CO conversion at 200 h | Comments |
|---|---|---|---|---|---|
| A | CO coated in wax | 265 | 87 | 80 | Inventive Activation/Coating |
| B | Syngas @ $H_2/CO = 1$ | 265 | 87 | 81 | A typical Optimized Syngas Activation |
| C | $H_2$ Followed by Syngas | 180, 264 | 80 | N/A | Two Step Activation |
| D, lab version | $H_2$ only | 275 | 77 | 74 | $H_2$ Only Activation |

The above data show that the activity of the catalyst, using the disclosed catalyst activation and coating is comparable to other suitable activations in the prior art for this type of FT catalyst.

Example 3

Table 3 provides process conditions and system component configuration for catalyst activation and sizing according to an embodiment.

TABLE 3

Example Process Conditions and System Component Configuration for Activation and Sizing

| Process Conditions: | |
|---|---|
| Reducing gas: | Syngas ($H_2$ + CO) |
| $H_2$/CO Ratio: | 1:1~10:1 |
| Temperature: | 230~350° C. |
| Pressure: | 1~20 bars |
| Gas Hourly Rate: | 1000-3000 vol/vol/hr |
| Configuration: | |
| Phase: | Gas plus Solid |
| Distributor: | PCM 0.5~10 μm |
| Internal Cyclone: | Single or multiple |
| Classification: | 95% > 2 μm |
| Hydrocarbon KO: | yes |
| Water KO: | yes |
| Water absorbent: | yes |
| Reducing gas recycle: | yes |
| External filter: | yes, <0.1~0.5 μm |

This example utilizes synthesis gas as the reducing gas. The $H_2$/CO ratio, temperature, pressure, and gas hourly velocity can be optimized for maximum reducibility. The configuration contains single or multiple cyclones in the reduction vessel to classify the particle size.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method of activating Fischer-Tropsch catalyst particles comprising oxides, the method comprising:
   contacting the catalyst particles with at least one activation gas in an activation vessel to produce an activated catalyst, wherein contacting is performed in the absence of a liquid medium under activation conditions, and
   extracting a gas stream comprising entrained catalyst fines from the activation reactor,
   whereby catalyst fines below an average cutoff size can be selectively removed during activation.

2. The method of claim 1 further comprising introducing the gas stream comprising entrained catalyst fines into an external gas/solids separation device configured to separate the catalyst fines from an effluent gas comprising activation gas.

3. The method of claim 1 wherein less than about 5 wt % of the activated catalyst has a particle size of less than 10 μm.

4. The method of claim 3 wherein selectively removing catalyst fines below an average cutoff size during activation comprises separating the fines from the activation vessel with at least one gas/solids separation device.

5. The method of claim 4 wherein one of the at least one gas/solids separation devices is located at least partially internal to the activation reactor.

6. The method of claim 5 wherein the at least one gas/solids separation device is selected from cyclones, filtration units, and combinations thereof.

7. The method of claim 1 wherein the activation vessel is a fluidized bed reactor.

8. The method of claim 7 wherein the catalyst particles have an average particle diameter in the range of from 0.5 μm to 200 μm prior to activation.

9. The method of claim 7 wherein contacting the catalyst particles with the at least one activation gas comprises suspending the catalyst particles with the at least one activation gas at a minimum gas velocity of 4 to 10 times the minimum fluidization velocity for the average catalyst particle size prior to activation.

10. The method of claim 1 wherein the activation vessel is a fixed bed reactor.

11. The method of claim 10 wherein the catalyst particles have an average particle size in the range of from about 1 mm to about 5 mm prior to activation.

12. The method of claim 1 further comprising maintaining two phase operation throughout the duration of activation by operating at activation conditions at which the non-catalyst contents of the activation vessel remain in the vapor phase.

13. The method of claim 1 wherein the activation conditions are selected to minimize the amount of fines, having a particle size less than about 20 μm, generated during activation.

14. The method of claim 1 further comprising selecting Fischer-Tropsch catalyst particles having an average starting particle size such that the activated particles have an average desired activated particle size.

15. The method of claim 2 further comprising condensing the effluent gas, whereby water, hydrocarbons, or both are removed therefrom, thus providing a non-condensed gas comprising reducing gas.

16. The method of claim 15 further comprising recycling at least a portion of the non-condensed gas to the contacting step.

17. A method of producing hydrocarbons from synthesis gas, the method comprising feeding activated catalyst produced via the method of claim 1 to slurry bubble column via a slip stream.

18. The method of claim 17 comprising no additional activation or synthesis gas treatment of activated catalyst produced via the method of claim 1 prior to feeding.

19. The method of claim 2 wherein the external gas/solids seperation device comprises a filtration unit.

20. The method of claim 1 wherein the catalyst particles comprise precipitated iron-based catalyst particles.

21. The method of claim 1 wherein contacting the catalyst particles with the at least one activation gas is performed at an activation temperature in the range of from about 260° C. to about 285° C.

22. The method of claim 1 wherein contacting the catalyst particles with the at least one activation gas comprises contacting the catalyst particles with hydrogen, whereby the catalyst particles are reduced, and subsequently contacting the reduced catalyst particles with a gas comprising carbon monoxide, whereby the catalyst particles are carbided.

23. The method of claim 1 wherein contacting the catalyst particles with the at least one activation gas comprises: contacting the catalyst particles with a gas comprising primarily or consisting essentially of carbon monoxide, or contacting the catalyst particles with a reducing gas comprising substantially no carbon monoxide to produce reduced catalyst particles prior to contacting the reduced catalyst particles with a gas comprising carbon monoxide.

24. The method of claim 23 wherein the reducing gas comprises hydrogen and substantially no carbon monoxide; wherein the gas comprising carbon monoxide comprises carbon monoxide and substantially no hydrogen, wherein the gas comprising carbon monoxide comprises both hydrogen and carbon monoxide; or a combination thereof.

* * * * *